(12) United States Patent
Sakai et al.

(10) Patent No.: US 9,953,419 B2
(45) Date of Patent: Apr. 24, 2018

(54) METHOD FOR ANALYZING MICROSTRUCTURE OF POROUS BODY, AND PROGRAM AND MICROSTRUCTURE ANALYZER FOR THE SAME

(71) Applicant: NGK INSULATORS, LTD., Nagoya (JP)

(72) Inventors: Ayaka Sakai, Nagoya (JP); Satoshi Sakashita, Yokkaichi (JP); Hiroyuki Nagaoka, Kakamigahara (JP)

(73) Assignee: NGK Insulators, Ltd., Nagoya (JP)

( * ) Notice: Subject to any disclaimer, the term of this patent is extended or adjusted under 35 U.S.C. 154(b) by 203 days.

(21) Appl. No.: 15/086,684

(22) Filed: Mar. 31, 2016

(65) Prior Publication Data

US 2016/0307318 A1 Oct. 20, 2016

(30) Foreign Application Priority Data

Apr. 14, 2016 (JP) .................................. 2015-082708

(51) Int. Cl.
*G06K 9/00* (2006.01)
*G06T 7/00* (2017.01)
(Continued)

(52) U.S. Cl.
CPC .......... *G06T 7/0014* (2013.01); *G06T 7/0004* (2013.01); *G06T 7/60* (2013.01);
(Continued)

(58) Field of Classification Search
CPC ....... G06T 7/0014; G06T 7/74; G06T 7/0004; G06T 7/60; G06T 15/08; G06T 2200/04; G06T 2207/30004
See application file for complete search history.

(56) References Cited

U.S. PATENT DOCUMENTS 6,772,026 B2 * 8/2004 Bradbury ............ A61F 2/30942
607/1
2007/0243137 A1 * 10/2007 Hainfeld ............. A61K 49/0021
424/9.34
(Continued)

FOREIGN PATENT DOCUMENTS

EP 2 832 417 A1 2/2015
JP 2011-079732 A1 4/2011
WO 2011/002754 A2 1/2011

OTHER PUBLICATIONS

Extended European Search Report (Application No. 16163221.1) dated Sep. 13, 2016.

*Primary Examiner* — Shefali Goradia
(74) *Attorney, Agent, or Firm* — Burr & Brown, PLLC

(57) ABSTRACT

A method for analyzing a microstructure of a porous body is, for example, a method using porous-body data in which positional information providing a position of a voxel of a porous body obtained by three-dimensional scanning is associated with voxel type information including information that allows determination as to whether the voxel is a spatial voxel representing a space or an object voxel representing an object. This method includes (a) a step of defining an imaginary surface that is in contact with at least one object voxel present on a surface of the porous body, and identifying, as opening-related voxels, spatial voxels that are in contact with the imaginary surface and spatial voxels that continuously lie in a linear direction from the imaginary surface; and (b) a step of analyzing a microstructure of the porous body on a basis of the opening-related voxels.

9 Claims, 14 Drawing Sheets

(51) Int. Cl.
*G06T 7/60* (2017.01)
*G06T 15/08* (2011.01)
*G06T 7/73* (2017.01)

(52) U.S. Cl.
CPC ............... *G06T 7/74* (2017.01); *G06T 15/08* (2013.01); *G06T 2200/04* (2013.01); *G06T 2207/30004* (2013.01)

(56) References Cited

U.S. PATENT DOCUMENTS

| | | | |
|---|---|---|---|
| 2011/0004448 A1 | 1/2011 | Hurley et al. | |
| 2012/0313937 A1* | 12/2012 | Beeler ................. | G06T 19/00 345/419 |
| 2013/0336578 A1* | 12/2013 | Sakashita ............. | C04B 38/00 382/154 |
| 2015/0107206 A1 | 4/2015 | Sakashita et al. | |

* cited by examiner

FIG. 6

| X COORDINATE | Y COORDINATE | Z COORDINATE | TYPE INFORMATION |
|---|---|---|---|
| 1 | 1 | 1 | 0 |
| 2 | 1 | 1 | 0 |
| 3 | 1 | 1 | 0 |
| 4 | 1 | 1 | 9 |
| 5 | 1 | 1 | 0 |
| 6 | 1 | 1 | 9 |
| 7 | 1 | 1 | 9 |
| ⋮ | ⋮ | ⋮ | ⋮ |
| 250 | 400 | 400 | 9 |

| INFLOW PLANE | OUTFLOW PLANE |
|---|---|
| X=1 | X=251 |

FIG. 9

| UPDATE TABLE BASED ON IMAGINARY SURFACE ON INFLOW PLANE SIDE | | | |
|---|---|---|---|
| X COORDINATE | Y COORDINATE | Z COORDINATE | TYPE INFORMATION |
| 1 | 1 | 1 | 1 |
| 2 | 1 | 1 | 1 |
| 3 | 1 | 1 | 1 |
| 4 | 1 | 1 | 9 |
| 5 | 1 | 1 | 0 |
| 6 | 1 | 1 | 9 |
| 7 | 1 | 1 | 9 |
| ... | ... | ... | ... |
| 250 | 400 | 400 | 9 |

— 81

| UPDATE TABLE BASED ON IMAGINARY SURFACE ON OUTFLOW PLANE SIDE | | | |
|---|---|---|---|
| X COORDINATE | Y COORDINATE | Z COORDINATE | TYPE INFORMATION |

— 82

METHOD FOR ANALYZING MICROSTRUCTURE OF POROUS BODY, AND PROGRAM AND MICROSTRUCTURE ANALYZER FOR THE SAME

BACKGROUND OF THE INVENTION

1. Field of the Invention

The present invention relates to a method for analyzing a microstructure of a porous body, and a program and a microstructure analyzer used for the method.

2. Description of the Related Art

One of methods for analyzing a microstructure such as pores of porous bodies is a method for obtaining three-dimensional pixel data of a porous body by performing a CT scan and carrying out analysis on the basis of the pixel data. For example, PTL 1 discloses a pore-continuity analysis method in which imaginary spheres having various diameters are arranged so as to fill pixels representing a space in pixel data and the continuity of pores from one surface to the other surface of the porous body is derived on the basis of information concerning the arranged imaginary spheres.

CITATION LIST

Patent Literature

PTL 1: Japanese Unexamined Patent Application Publication No. 2011-079732

SUMMARY OF THE INVENTION

In the above-described pore-continuity analysis method, the continuity of pores of porous bodies is investigated. However, it is not disclosed that portions (pore-linear portions) of pores that linearly extend from openings (openings on a surface of the porous body) are investigated.

In view of the foregoing, a main object of the present invention is to obtain information of portions of pores that linearly extend from openings.

The method for analyzing a microstructure according to the present invention includes:

a method for analyzing a microstructure of a porous body using porous-body data in which positional information providing a position of a voxel of a porous body obtained by three-dimensional scanning is associated with voxel type information including information that allows determination as to whether the voxel is a spatial voxel representing a space or an object voxel representing an object, the method comprising:

(a) a step of defining an imaginary surface that is in contact with at least one object voxel present on a surface of the porous body, and identifying, as opening-related voxels, a spatial voxel that is in contact with the imaginary surface and a predetermined number or more of spatial voxels that continuously lie in a predetermined linear direction from the imaginary surface toward an inside of the porous body or identifying, as opening-related voxels, a predetermined number or more of spatial voxels that continuously lie in a predetermined linear direction from the imaginary surface toward an inside of the porous body; and (b) a step of analyzing a microstructure of the porous body on a basis of the opening-related voxels.

In this method for analyzing a microstructure, an imaginary surface that is in contact with at least one object voxel present on a surface of a porous body is defined. Subsequently, spatial voxels that are in contact with the imaginary surface and a predetermined number or more of spatial voxels that continuously lie in a predetermined linear direction from the imaginary surface toward the inside of the porous body are identified as opening-related voxels. Alternatively, a predetermined number or more of spatial voxels that continuously lie in a predetermined linear direction from the imaginary surface toward the inside of the porous body are identified as opening-related voxels. The predetermined number is an integer of 2 or more. Then, the microstructure of the porous body is analyzed on the basis of the opening-related voxels. Although pores of the porous body often bend, it is believed that pore-linear portions, which are portions of pores that linearly extend from openings, have a relatively large influence on the characteristics of the porous body. Such pore-linear portions can be expressed using the opening-related voxels. Therefore, information concerning the pore-linear portions can be obtained by analyzing the microstructure of the porous body on the basis of the opening-related voxels.

In the method for analyzing a microstructure according to the present invention, in the step (a), (i) the imaginary surface may be a plane parallel to any of an XY plane, an XZ plane, and a YZ plane in three-dimensional coordinates or (ii) the imaginary surface may be a plane which is in contact with three or more object voxels present on a surface of the porous body and in which a triangle formed by at least one set of three object voxels selected from the three or more object voxels involves a barycenter of the surface of the porous body. For example, when three-dimensional scanning of the porous body through which gas passes from the inflow plane to the outflow plane is performed, the three-dimensional scanning is normally performed while the inflow plane and the outflow plane are arranged so as to be parallel to any of an XY plane, an XZ plane, and a YZ plane as much as possible. Therefore, as in the case of (i), a plane which is the most parallel to the inflow plane and the outflow plane is selected among the XY plane, the XZ plane, and the YZ plane, and an imaginary surface may be defined so as to be parallel to the plane. In this case, the predetermined linear direction is preferably a direction perpendicular to the imaginary surface. Furthermore, when the inflow plane and the outflow plane have a certain angle with any of the XY plane, the XZ plane, and the YZ plane, the imaginary surface is preferably defined as in the case of (ii). In this case, the predetermined linear direction may be a direction perpendicular to the imaginary surface or a direction of an axis (X, Y, or Z axis) closest to the direction perpendicular to the imaginary surface.

In the method for analyzing a microstructure according to the present invention, in the step (b), when the microstructure of the porous body is analyzed on a basis of the opening-related voxels, the microstructure of the porous body may be analyzed on a basis of at least information obtained from the opening-related voxels that appear on the imaginary surface. The information is, for example, information concerning straight pores constituted by opening-related voxels that continuously lie in the linear direction from the imaginary surface. The straight pores may extend in a direction perpendicular to the imaginary surface or in a direction not perpendicular to the imaginary surface. Examples of the information concerning the straight pores include the length (depth) of straight pores and the number of straight pores.

In the method for analyzing a microstructure according to the present invention, in the step (b), when the microstructure of the porous body is analyzed on a basis of the opening-related voxels, a plane obtained by shifting the imaginary surface in an inward direction of the porous body by a predetermined distance may be defined as an imaginary reference plane, and the microstructure of the porous body may be analyzed on a basis of at least information obtained from the opening-related voxels that appear on the imaginary reference plane. The information is, for example, information concerning a pore-linear portion that is an aggregate of opening-related voxels adjacent to each other on the imaginary reference plane. Examples of the information concerning the pore-linear portion include the number of openings of pore-linear portions, the average of opening diameters, the standard deviation of opening diameters, the average of opening areas, the standard deviation of opening areas, and the opening ratio.

In the method for analyzing a microstructure according to the present invention, when the plane obtained by shifting the imaginary surface in an inward direction of the porous body by a predetermined distance is defined as the imaginary reference plane, the predetermined distance may be set as follow. That is, multiple pieces of porous-body data having different porosities may be prepared in advance, a relationship between a distance from the imaginary surface to an imaginary section and a proportion of the opening-related voxels on the imaginary section may be determined for each of the porous-body data, a range of the distance in which an ascending order of the proportion matches an ascending order of the porosity may be determined, and the predetermined distance may be set within the range. It is generally assumed that the proportion of the opening-related voxels on the imaginary section of the porous body increases as the porosity of the porous body increases. However, when the imaginary section is located extremely close to the surface of the porous body, simple irregularities (not pores) on the surface of the porous body are counted as the opening-related voxels. Consequently, the proportion of the opening-related voxels on the imaginary section sometimes increases even if the porosity is low. In this case, the proportion of the opening-related voxels on the imaginary section is sometimes larger in the porous body with low porosity than in the porous body with high porosity. To avoid this, the predetermined distance of the shift may be set so that the ascending order of the proportion of the opening-related voxels on the imaginary section matches the ascending order of the porosity.

A program according to the present invention causes one or more computers to perform each step in the method for analyzing a microstructure according to the present invention in any one of the aspects described above. This program may be stored in a storage medium (e.g., hard disk, ROM, FD, CD, and DVD) that can be read by computers, may be distributed from one computer to another computer through a transmission medium (communications network such as the Internet and LAN), or may be transmitted and received by any method. When this program is executed by a single computer or this program is executed by a plurality of computers each allocated for its corresponding step, each step of the method for analyzing a microstructure described above is executed, and thus the same effects as those in the method for analyzing a microstructure are achieved.

A microstructure analyzer according to the present invention includes:

storage for storing porous-body data in which positional information providing a position of a voxel of a porous body obtained by three-dimensional scanning is associated with voxel type information including information that allows determination as to whether the voxel is a spatial voxel representing a space or an object voxel representing an object;

identification device for defining an imaginary surface that is in contact with at least one object voxel present on a surface of the porous body, and identifying, as opening-related voxels, spatial voxels that are in contact with the imaginary surface and a predetermined number or more of spatial voxels that continuously lie in a predetermined linear direction from the imaginary surface toward an inside of the porous body or identifying, as opening-related voxels, a predetermined number or more of spatial voxels that continuously lie in a predetermined linear direction from the imaginary surface toward an inside of the porous body; and an analyzier for analyzing a microstructure of the porous body on a basis of the opening-related voxels.

In this microstructure analyzer, an imaginary surface that is in contact with at least one object voxel present on the surface of a porous body is defined. Subsequently, a spatial voxel that is in contact with the imaginary surface and a predetermined number or more of spatial voxels that continuously lie in a predetermined linear direction from the imaginary surface toward the inside of the porous body are identified as opening-related voxels. Alternatively, a predetermined number or more of spatial voxels that continuously lie in a predetermined linear direction from the imaginary surface toward the inside of the porous body are identified as opening-related voxels. The predetermined number is an integer of 2 or more. Then, the microstructure of the porous body is analyzed on the basis of the opening-related voxels. Although pores of the porous body often bend, it is believed that pore-linear portions, which are portions of pores that linearly extend from openings, have a relatively large influence on the characteristics of the porous body. Such pore-linear portions can be expressed using the opening-related voxels. Therefore, information concerning the pore-linear portions can be obtained by analyzing the microstructure of the porous body on the basis of the opening-related voxels. In the microstructure analyzer according to the present invention, another operation of each devices may be added or another devices may be added to perform each step of any of the above-described methods for analyzing a microstructure.

BRIEF DESCRIPTION OF THE DRAWINGS

FIG. 6 is an explanatory view of porous-body data 60.

FIG. 9 is an explanatory view of update tables 81 and 82.

DETAILED DESCRIPTION OF THE INVENTION

Preferred embodiments of the present invention will be described with reference to the attached drawings.

Figure 1:
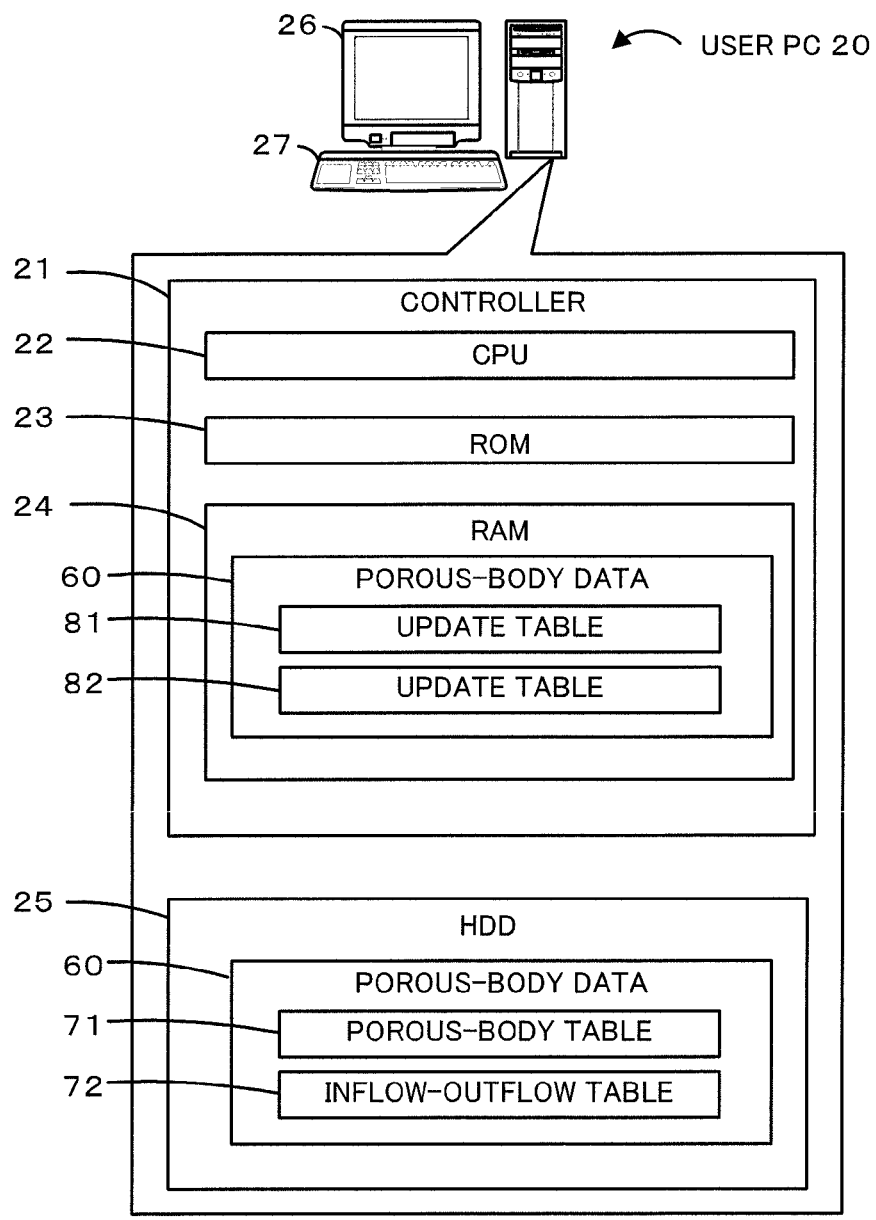
FIG. 1 schematically illustrates the configuration of a user personal computer (PC) 20.

FIG. 1 schematically illustrates the configuration of a user personal computer (PC) 20, which is an embodiment of a microstructure analyzer according to the present invention. The user PC 20 includes a controller 21 including a CPU 22 that executes various processes, a ROM 23 that stores various processing programs and the like, and a RAM 24 that temporarily stores data; and a HDD 25 which is a mass storage memory storing various processing programs such as analysis processing programs and various data such as porous-body data 60 that is three-dimensional pixel data of a porous body. The user PC 20 is equipped with a display 26 that displays various information on the screen and an input device 27 with which the user inputs various commands, such as a keyboard. As will be described in detail below, the porous-body data 60 stored in the HDD 25 includes a porous-body table 71 and an inflow-outflow table 72. The user PC 20 functions to analyze the microstructure of a porous body on the basis of the porous-body data 60 stored in the HDD 25. During this analysis of the microstructure, data similar to the porous-body data 60 is stored in the RAM 24. Note that update tables 81 and 82 in which the porous-body data 60 is updated are stored in the RAM 24, which will be described below.

Figure 2:
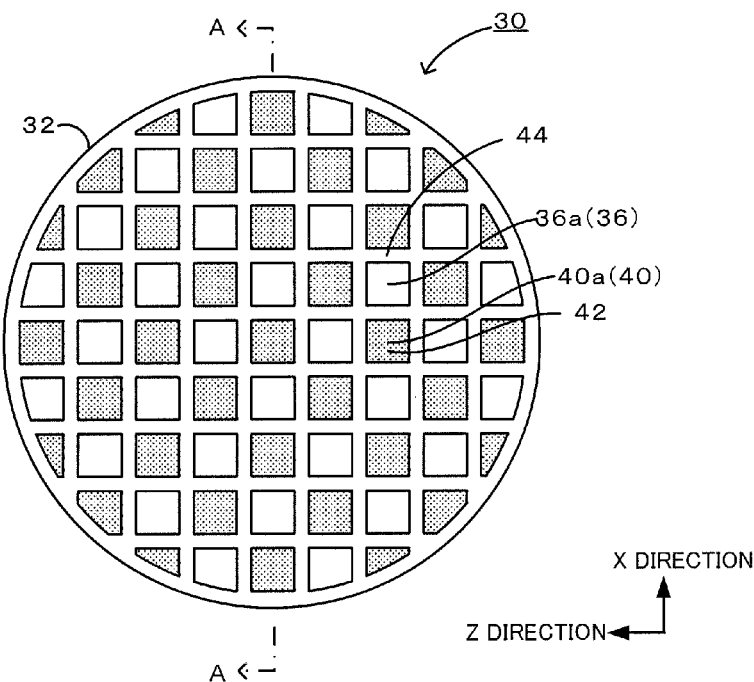
FIG. 2 is a front view of a honeycomb filter 30 including porous partitions 44 formed of a porous body.
Figure 3:
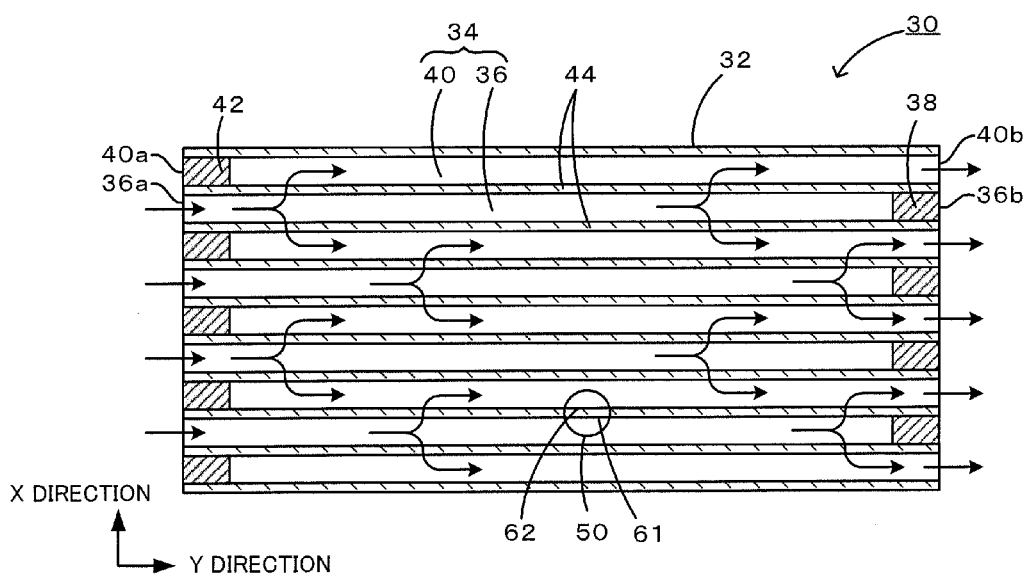
FIG. 3 is a sectional view taken along line A-A in FIG. 2.

The porous body analyzed with the user PC 20 will now be described. FIG. 2 is a front view of a honeycomb filter 30 including porous partitions 44 formed of a porous body. FIG. 3 is a sectional view taken along line A-A in FIG. 2.

The honeycomb filter 30 is a diesel particulate filter (DPF) having a function of filtering particulate matter (PM) in exhaust gas emitted from a diesel engine. The honeycomb filter 30 includes a large number of cells 34 (refer to FIG. 3) defined by the porous partitions 44. A peripheral protective part 32 is formed around the cells 34. The material for the porous partitions 44 is preferably a ceramic material formed of inorganic particles of Si—SiC, cordierite, or the like from the viewpoint of strength and heat resistance. The porous partitions 44 preferably have a thickness of 100 µm or more and less than 600 µm. In this embodiment, the thickness is 300 µm. The porous partitions 44 have an average pore size (measured by mercury porosimetry) of 10 µm or more and less than 60 µm and a porosity (void ratio) of 30% or more and less than 70%, for example. As illustrated in FIG. 3, the large number of cells 34 formed in the honeycomb filter 30 are divided into open-inlet cells 36 having an open inlet 36a and an outlet 36b sealed with an outlet sealing material 38, and open-outlet cells 40 having an inlet 40a sealed with an inlet sealing material 42 and an open outlet 40b. Such open-inlet cells 36 and open-outlet cells 40 are alternately disposed so as to be adjacent to one another. The density of the cells is, for example, 15 cells/cm$^2$ or more and less than 65 cells/cm$^2$. The peripheral protective part 32 is a layer for protecting the periphery of the honeycomb filter 30. The peripheral protective part 32 may contain, for example, the above-described inorganic particles, inorganic fibers of aluminosilicate, alumina, silica, zirconia, ceria, mullite, or the like, and a binder such as colloidal silica or clay.

For example, the honeycomb filter 30 is placed downstream of a diesel engine (not shown) and used to clean PM-containing exhaust gas and to release the exhaust gas into the air. Arrows in FIG. 3 indicate flows of exhaust gas in this occasion. The PM-containing exhaust gas emitted from the diesel engine flows through the inlets 36a of the honeycomb filter 30 into the open-inlet cells 36, then passes through the porous partitions 44 into the adjacent open-outlet cells 40, and is released through the outlets 40b of the open-outlet cells 40 into the air. While the PM-containing exhaust gas flows from the open-inlet cells 36 through the porous partitions 44 into the open-outlet cells 40, PM is trapped; and hence the exhaust gas having flowed into the open-outlet cells 40 is a clean exhaust gas not containing PM. The interior of the pores in the porous partitions 44 is coated with an oxidation catalyst such as platinum (not shown). The oxidation catalyst oxidizes trapped PM to thereby suppress a decrease in the porosity of the porous partitions 44 or a sharp increase in pressure loss.

The honeycomb filter 30 can be produced using, as a raw material, clay or slurry prepared by mixing, for example, a base material, a pore-forming material, and a dispersing material. The base material may be the above-described ceramic material. For example, when the base material is formed of SiC, a mixture prepared by mixing a SiC powder and a metal Si powder at a mass ratio of 80:20 may be used. The pore-forming material is preferably burnt off by firing performed later and may be, for example, starch, coke, or resin foam. The dispersing material may be a surfactant such as ethylene glycol. The step for preparing the clay is not particularly limited, and the clay may be prepared by, for example, a method that uses a kneader, a vacuum clay kneader, or the like. The clay is, for example, extruded using a die having a shape corresponding to the arrangement of the cells 34 so as to have the shape illustrated in FIGS. 2 and 3. The cells 34 are sealed with the outlet sealing material 38 and the inlet sealing material 42. Subsequently, the extruded material is subjected to a drying treatment, a calcination treatment, and a firing treatment to produce the honeycomb filter 30 including the porous partitions 44. The outlet sealing material 38 and the inlet sealing material 42 may be formed of the raw material for the porous partitions 44. The calcination treatment is performed at a temperature lower than the firing temperature to burn off organic components contained in the honeycomb filter 30. The firing temperature is 1400° C. to 1450° C. when cordierite is used as a raw material. The firing temperature is 1450° C. when Si—SiC is used as a raw material. By performing such processes, the honeycomb filter 30 including the porous partitions 44 can be obtained.

The HDD 25 of the user PC 20 stores, as the porous-body data 60, three-dimensional voxel data of the porous partitions 44 obtained by subjecting the honeycomb filter 30 to a CT scan. In this embodiment, an XY plane defined by the X direction and the Y direction illustrated in FIG. 3 is selected as an imaging section, and a plurality of such imaging sections are produced in the Z direction illustrated in FIG. 2. In this manner, the CT scan is performed to obtain voxel data. In this embodiment, the resolution in each of the X, Y, and Z directions is 1.2 μm, which provides a cube having 1.2 μm sides and serving as a voxel. The resolution in each of the X, Y, and Z directions can be appropriately set in accordance with, for example, the performance of a CT scanner or the size of particles to be analyzed. The resolutions in the directions may be different from each other. Although not particularly limited, the resolutions in the X, Y, and Z directions may be set to values within a range of, for example, 0.1 to 3.0 μm. As the resolutions are increased (the lengths of a voxel in the X, Y, and Z directions are decreased), the precision of analysis increases. From the viewpoint of the precision of analysis, the resolutions in the X, Y, and Z directions are preferably 3.0 μm or less. Although the analysis time (calculation time) increases as the resolutions are increased, the resolutions in the X, Y, and Z directions may be less than 0.5 μm. The resolutions may be, for example, 0.2 μm to 0.3 μm or less than 0.2 μm. The position of each voxel is identified by X, Y, and Z coordinates (a coordinate value of 1 corresponds to a length of a side of a voxel, 1.2 μm). The coordinates are associated with type information indicating whether the voxel represents a space (pore) or an object (material for the porous partitions 44) and stored in the HDD 25. In this embodiment, voxels representing spaces (spatial voxels) are tagged with a type-information value of 0, and voxels representing objects (object voxels) are tagged with a type-information value of 9. The data actually obtained by a CT scan is, for example, luminance data at individual X, Y, and Z coordinates. The porous-body data 60 used in this embodiment can be obtained by converting the luminance data into a binary representation with respect to a predetermined threshold so that voxels are determined for each of the coordinates as to whether each voxel is a spatial voxel or an object voxel. The predetermined threshold is set as a value that allows appropriate determination as to whether the voxels are spatial voxels or object voxels. The threshold may be, for example, empirically set in advance such that the measured porosity of the porous partitions 44 is substantially equal to the porosity of the binarized voxel data. Alternatively, the threshold may be automatically determined from the luminance distribution of the luminance data (e.g., discriminant analysis method (Otsu's method)). Such a CT scan can be performed with, for example, SMX-160CT-SV3 manufactured by SHIMADZU CORPORATION.

Figure 4:
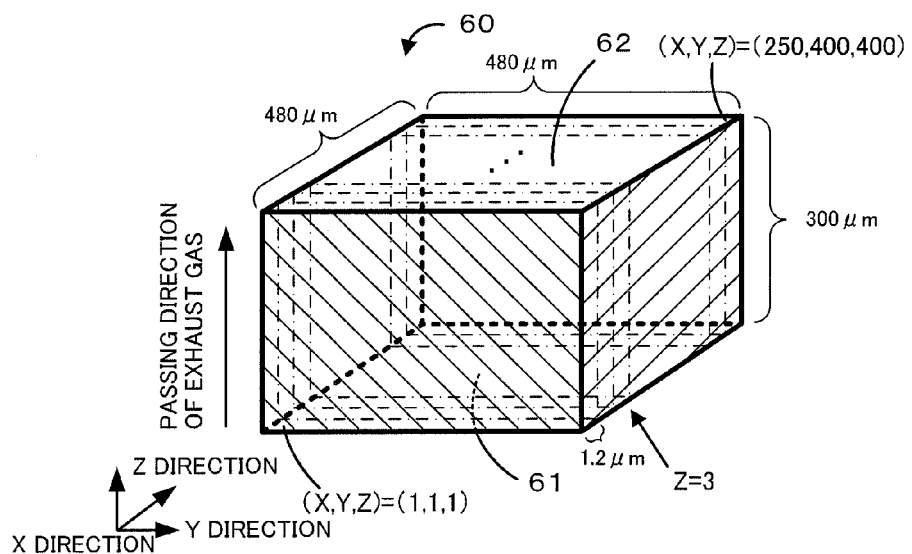
FIG. 4 illustrates a conceptual view of porous-body data 60.
Figure 5:
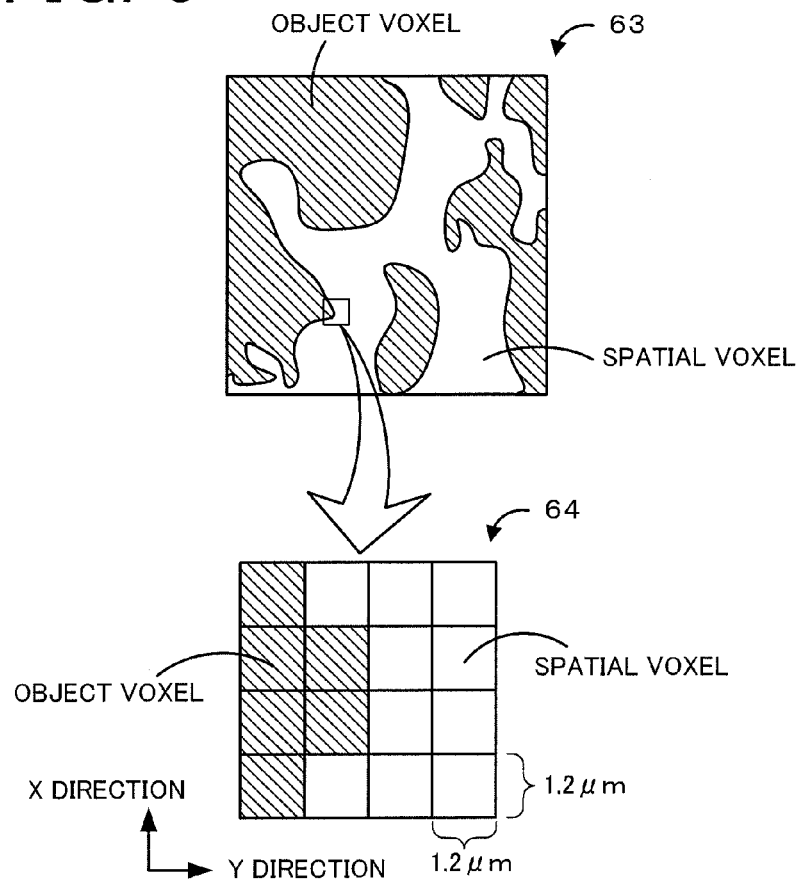
FIG. 5 is an explanatory view of an XY plane (imaging section) 63 of a porous partitions 44.

FIG. 4 illustrates a conceptual view of the porous-body data 60. FIG. 4 is a conceptual view of the porous-body data 60 obtained as voxel data by subjecting the porous partition 44 in a region 50 in FIG. 3 to a CT scan. The porous-body data 60 in this embodiment is extracted from the voxel data of the porous partition 44. The porous-body data 60 is voxel data of a rectangular parallelepiped portion having a length of 300 μm (=1.2 μm×250 voxels) in the X direction, which is the same as the thickness of the porous partition 44 in the passing direction of exhaust gas, having a length of 480 μm (=1.2 μm×400 voxels) in the Y direction, and having a length of 480 μm (=1.2 μm×400 voxels) in the Z direction. The porous-body data 60 is subjected to the analysis processing described below. Note that the dimensions of the porous-body data 60 can be appropriately set in accordance with, for example, the thickness or size of the porous partition 44 or an acceptable calculation load. For example, the length in the X direction is not limited to 300 μm and may be another value that is the same as the thickness of the porous partition 44 in the passing direction of exhaust gas. The length in the X direction is preferably the same value as the thickness of the porous partition 44 in the passing direction of exhaust gas, but the length and the thickness may be different values. The lengths in the Y and Z directions are also not limited to 480 μm and may be other values. The lengths in the Y and Z directions may be different from each other. Among the six planes of the rectangular parallelepiped of the porous-body data 60, two planes (planes parallel to the YZ plane) are an inflow plane 61 (refer to FIG. 3) that is a boundary plane between the porous partition 44 and the open-inlet cell 36 and an outflow plane 62 (refer to FIG. 3) that is a boundary plane between the porous partition 44 and the open-outlet cell 40; and the other four planes are sections of the porous partition 44. FIG. 5 illustrates an XY plane (imaging section) 63 at a position where the Z coordinate value is 3 in the porous-body data 60 and an enlarged view 64 of a portion of the XY plane 63. As illustrated in the enlarged view 64, the XY plane 63 is made up of arranged voxels having 1.2 μm sides. Each voxel is represented by a spatial voxel or an object voxel. Note that the imaging section obtained by a CT scan is data of a plane having no thickness in the Z direction as illustrated in FIG. 5. However, each imaging section is handled as having a thickness of the gap (1.2 μm) between imaging sections in the Z direction. In other words, each voxel is handled as a cube having 1.2 μm sides as described above. Note that, as illustrated in FIG. 6, the porous-body data 60 is stored in the HDD 25 as data including the porous-body table 71 in which the XYZ coordinates of each voxel serving as positional information are associated with type information, and the inflow-outflow table 72 indicating the inflow plane 61 and the outflow plane 62. In FIG. 6, "X=1" in the inflow-outflow table 72 denotes a plane at X=1 of the XYZ coordinate system, the inflow plane 61 illustrated in FIG. 4. Similarly, "X=251" denotes the outflow plane 62. The HDD 25 stores, in addition to the porous-body data 60, multiple pieces of other porous-body data representing voxel data of the porous partitions 44 in regions other than the region 50.

As described above, the porous-body data 60 is voxel data of the porous partitions 44 obtained by subjecting the honeycomb filter 30 to a CT scan. When the CT scan is performed, the inflow plane 61 and the outflow plane 62 are arranged so as to be parallel to the YZ plane as much as possible in this embodiment.

Figure 7:
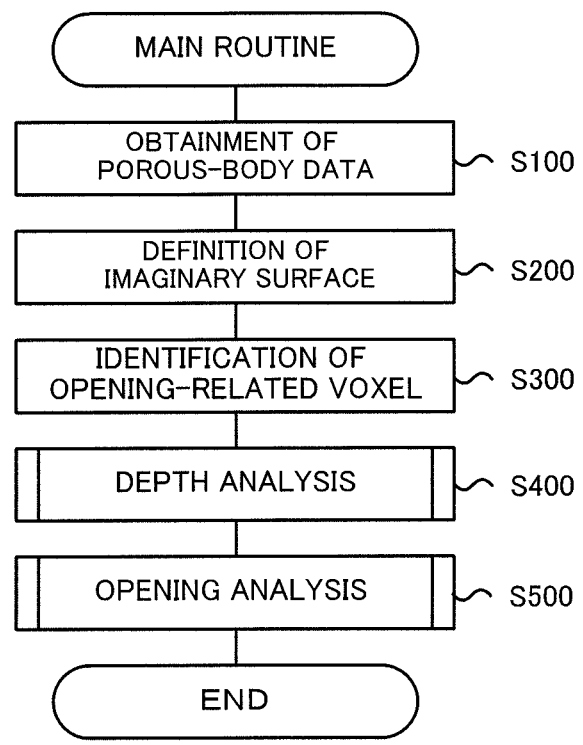
FIG. 7 is a flowchart illustrating an example of a main routine of the analysis processing.

Hereafter, analysis processing performed by the user PC 20 on the porous-body data 60 will be described. FIG. 7 is a flowchart illustrating an example of a main routine of the analysis processing. This main routine is carried out as follows: according to a command of carrying out analysis processing input by the user via the input device 27, the CPU 22 executes the analysis processing programs stored in the HDD 25. Hereafter, the case where the analysis processing of the porous-body data 60 is performed will be described. However, analysis processing of other porous-body data can be similarly performed. The porous-body data that is to be analyzed may be set in advance or may be selected by the user.

Upon start of the main routine, first, the CPU 22 obtains the porous-body data 60 (Step S100). Specifically, the CPU 22 reads the porous-body data 60 stored in the HDD 25 and stores it in the RAM 24. Thus, the same data as the porous-body data 60 stored in the HDD 25 and including the porous-body table 71 and the inflow-outflow table 72 is stored in the RAM 24.

Figure 8:
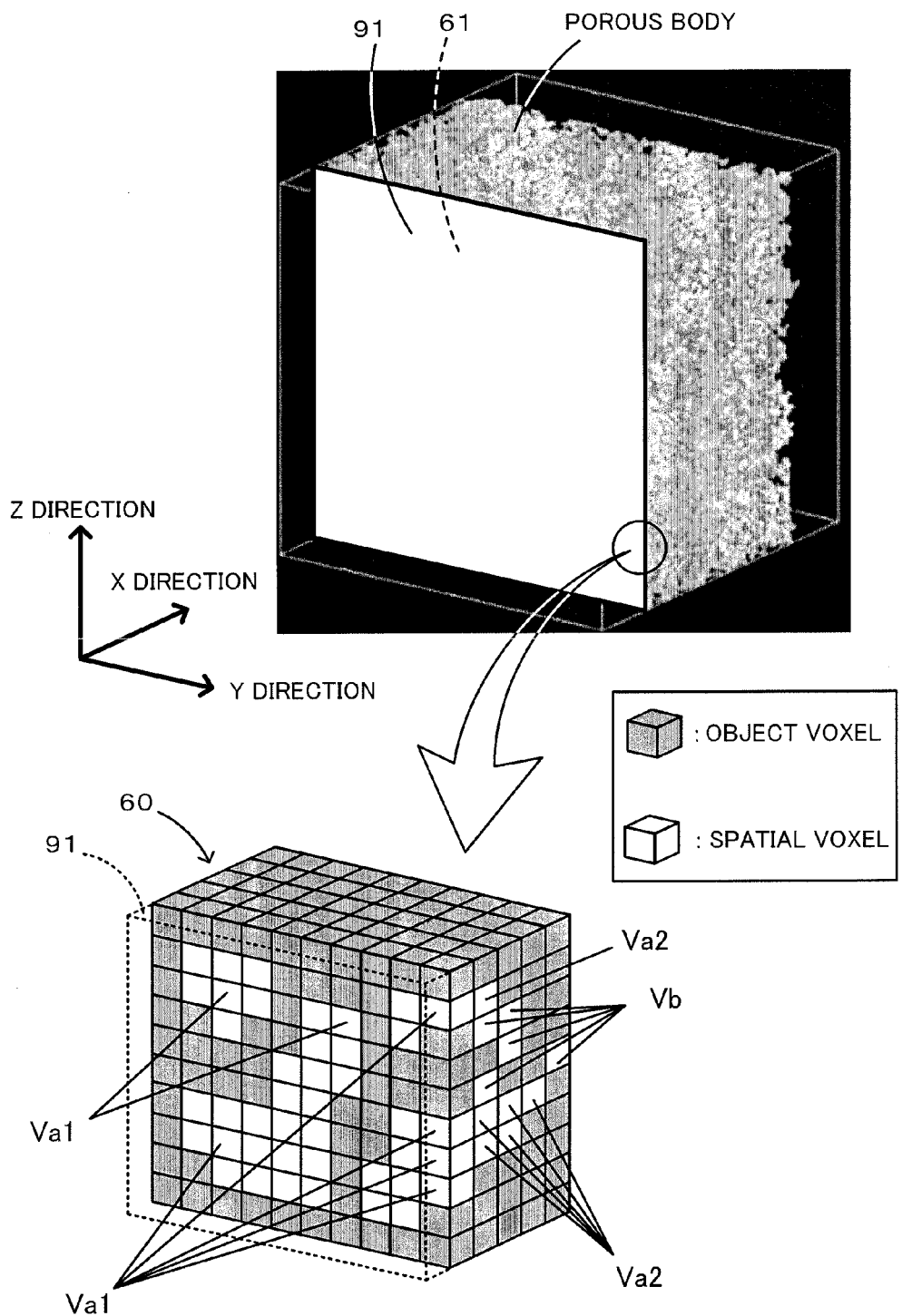
FIG. 8 is an explanatory view of an imaginary surface 91 and opening-related voxels.

Subsequently, the CPU 22 defines an imaginary surface (Step S200). Specifically, the CPU 22 defines an imaginary surface 91 on the inflow plane 61 side and an imaginary surface on the outflow plane 62 side. Since both the imaginary surfaces are defined by the same procedure, only the procedure for defining the imaginary surface 91 on the inflow plane 61 side will be described. As illustrated in FIG. 8, the CPU 22 defines the imaginary surface 91 on the inflow plane 61 side so that the imaginary surface 91 is in contact with at least one protruding object voxel present on the inflow plane 61 with irregularities of the porous body. The imaginary surface 91 is a plane parallel to the YZ plane, which is the most parallel to the inflow plane 61 of the porous body among the XY plane, the XZ plane, and the YZ plane in the three-dimensional coordinates. Since the imaginary surface 91 is constituted by three-dimensional voxels, the imaginary surface 91 is actually not a plane, but is a plate (three-dimensional shape). Herein, the phrase "the imaginary surface 91 is in contact with the object voxels" means that voxels constituting the imaginary surface 91 are in surface contact with object voxels. The imaginary surface on the outflow plane 62 side is defined in the same manner.

Subsequently, the CPU 22 identifies opening-related voxels (Step S300). Specifically, the CPU 22 identifies opening-related voxels on the basis of the imaginary surface 91 on the inflow plane 61 side and opening-related voxels on the basis of the imaginary surface on the outflow plane 62 side. Since both the opening-related voxels are identified by the same procedure, only the procedure for identifying opening-related voxels on the basis of the imaginary surface 91 on the inflow plane 61 side will be described. First, the CPU 22 identifies, as opening-related voxels, all spatial voxels (spatial voxels in contact with the imaginary surface 91) having an X coordinate value larger than the X coordinate value of the imaginary surface 91 by one, and updates the type information of the spatial voxels from a value of 0 to a value of 1. The type-information value of 1 indicates opening-related voxels. Subsequently, the CPU 22 selects one opening-related voxel from the opening-related voxels that are in contact with the imaginary surface 91; also identifies, as opening-related voxels, two or more spatial voxels that continuously lie in a predetermined linear direction (X direction) from the selected opening-related voxel toward the inside of the porous body; and updates the type information of the spatial voxels from a value of 0 to a value of 1. This procedure is performed on all opening-related voxels that are in contact with the imaginary surface 91. In the partially enlarged view in FIG. 8, for example, all spatial voxels that are in contact with the imaginary surface 91 are identified as opening-related voxels Va1. Furthermore, two or more spatial voxels that continuously lie in a predetermined linear direction (X direction) from the opening-related voxels Va1 toward the inside of the porous body are identified as opening-related voxels Va2. Other spatial voxels are identified as non-opening-related voxels Vb. The type information of the spatial voxels identified as the opening-related voxels Va1 and Va2 is updated from a value of 0 to a value of 1. The type information of the spatial voxels identified as the non-opening-related voxels Vb remains as a value of 0. After the completion of the operation of Step S300, the porous-body table 71 is updated to an update table 81 based on the imaginary surface 91 on the inflow plane 61 side in FIG. 9. An update table 82 based on the imaginary surface on the outflow plane 62 side is also made in the same manner.

Figure 10:
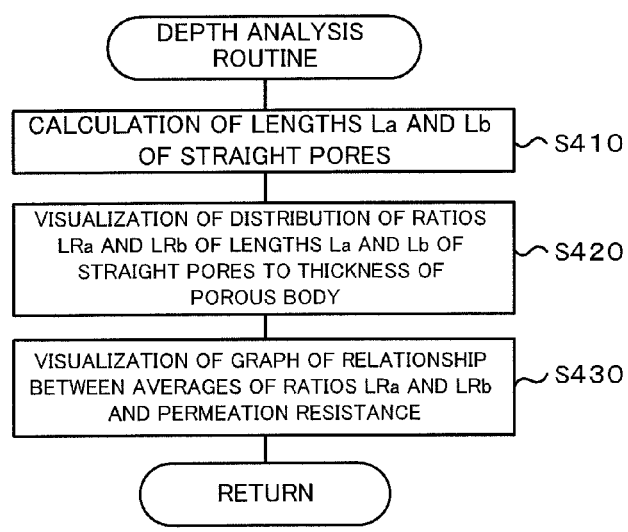
FIG. 10 is a flowchart illustrating an example of a depth analysis routine.

Subsequently, the CPU 22 executes a depth analysis routine (Step S400). This routine will be described with reference to the flowchart in FIG. 10.

Upon start of this routine, first, the CPU 22 calculates lengths La and Lb of straight pores (Step S410). The straight pore refers to an aggregate of voxels in a row constituted by opening-related voxels that continuously lie in a predetermined linear direction (X direction) from the imaginary surface toward the inside of the porous body or a single spatial voxel which is in contact with the imaginary surface and to which other spatial voxels are not joined in an inward direction of the porous body. The CPU 22 calculates the length La of straight pores based on the imaginary surface 91 on the inflow plane 61 side and the length Lb of straight pores based on the imaginary surface on the outflow plane 62 side. Specifically, the lengths La and Lb of straight pores are obtained by multiplying the number of opening-related voxels constituting each straight pore by the length of one side of the voxel (herein 1.2 μm).

Figure 11:
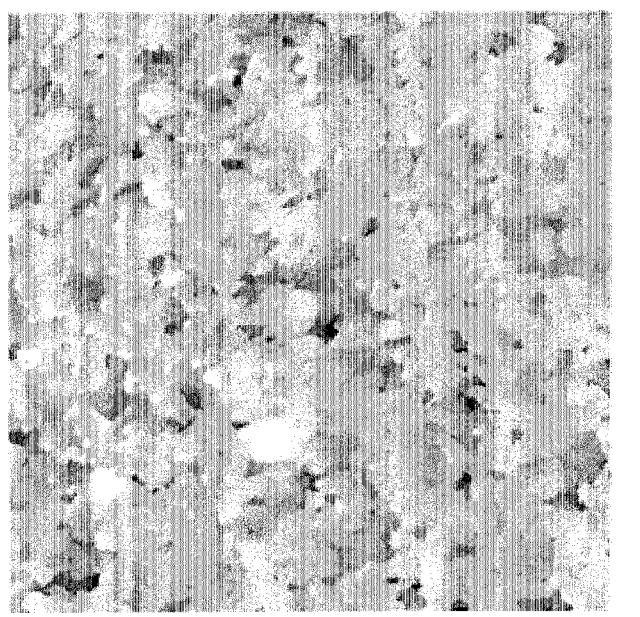
FIG. 11 is a distribution chart of a ratio of the length of a straight pore to the thickness of a porous body.
Figure 11:

Subsequently, the CPU 22 calculates the ratios LRa (%) and LRb (%) of the lengths La and Lb of straight pores to the thickness of the porous body, and visualizes the distribution of the ratios LRa and LRb and displays the distribution on the display 26 (Step S420). The thickness of the porous body is a length between the imaginary surface on the inflow plane 61 side and the imaginary surface on the outflow plane 62 side. For example, the visualization is performed as follows. The calculated ratios LRa and LRb are each divided into multiple sections, different colors (or lightness of gray) are allocated for the sections, voxels that appear on the imaginary surface are regarded as two-dimensional pixels, and each pixel is displayed with a color according to the ratios LRa and LRb. FIG. 11 illustrates one example thereof. The value on the right side of the gray scale is the ratio LRa (%). Thus, the operator can visually recognize the distribution of shallow (short) portions and deep (long) portions of straight pores.

Figure 12:
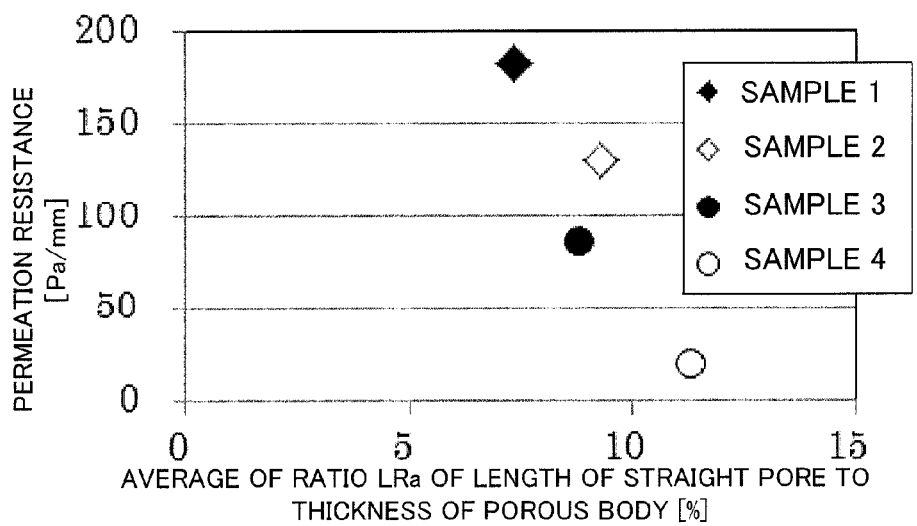
FIG. 12 is a graph showing the relationship between the average of a ratio of the length of a straight pore to the thickness of a porous body and the permeation resistance.

Subsequently, the CPU 22 plots a graph of the relationship between the averages of the ratios LRa and LRb and the permeation resistance and displays the relationship on the display 26 (Step S430). The CPU 22 ends this routine and returns to the main routine. FIG. 12 illustrates an example of a graph showing the relationship between the average of the ratio LRa and the permeation resistance. Herein, samples 1 to 4 of porous bodies having different porosities are prepared in advance, and subjected to a CT scan to obtain porous-body data. The ratio LRa and the permeation resistance are determined on the basis of the porous-body data and plotted on a graph. Note that the porosities of the samples 1 to 4 are in the range of 40% or more and 65% or less, and satisfies sample 1<sample 2 <sample 3<sample 4. The permeation resistance is substantially equal to pressure loss, and can be derived, for example, on the basis of fluid analysis results obtained by a well-known lattice Boltzmann method. The operator can understand from such a graph whether there is a correlation between the average of the ratio LRa and the permeation resistance. If there is some correlation, the operator can understand what the correlation is.

Figure 13:
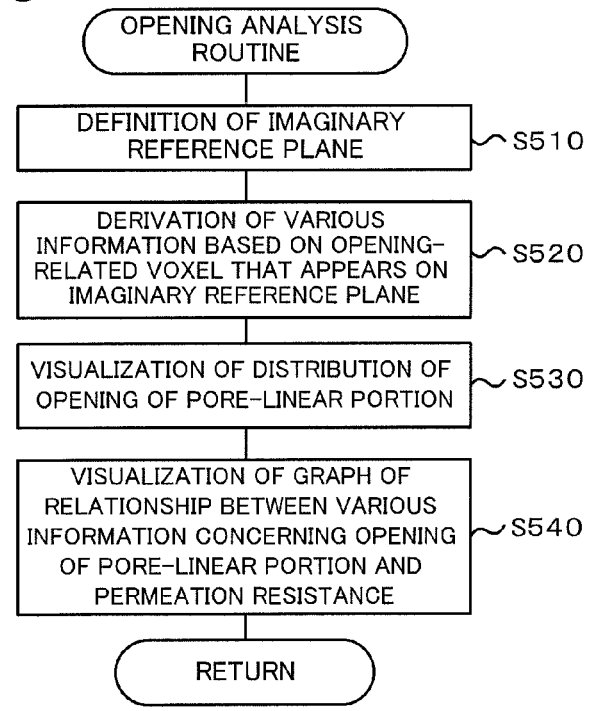
FIG. 13 is a flowchart illustrating an example of an opening analysis routine.

As illustrated in FIG. 7, the CPU 22 executes an opening analysis routine (Step S500) after the execution of the depth analysis routine (Step S400). This routine will be described with reference to the flowchart in FIG. 13.

Upon start of this routine, first, the CPU 22 defines an imaginary reference plane (Step S510). Specifically, the CPU 22 defines an imaginary reference plane on the inflow plane 61 side and an imaginary reference plane on the outflow plane 62 side. Since both the imaginary reference planes are defined by the same procedure, only the procedure for defining the imaginary reference plane on the inflow plane 61 side will be described. The CPU 22 defines, as an imaginary reference plane, a plane obtained by shifting the imaginary surface 91 on the inflow plane 61 side in an inward direction (X direction) of the porous body by a predetermined distance. In order to set the predetermined distance, the CPU 22 determines the relationship between the distance from the imaginary surface to an imaginary section and the proportion of opening-related voxels on the imaginary section using each of multiple pieces of porous-body data having different porosities and prepared in advance. The CPU 22 determines a range in which the ascending order of the proportion of the opening-related voxels on the imaginary section matches the ascending order of the porosity within the distance from the imaginary surface 91 to the imaginary section, and sets the predetermined distance of the shift within the above range. It is generally assumed that the proportion of the opening-related voxels on the imaginary section increases as the porosity of the porous body increases. However, when the imaginary section is located extremely close to the surface of the porous body simple irregularities (not pores) on the surface of the porous body are counted as the opening-related voxels. Consequently, the proportion of the opening-related voxels on the imaginary section sometimes increases even if the porosity is low. In this case, the proportion of the opening-related voxels on the imaginary section is sometimes larger in the porous body with low porosity than in the porous body with high porosity. To avoid this, the predetermined distance of the shift is set so that the ascending order of the proportion of the opening-related voxels on the imaginary section matches the ascending order of the porosity. If the proportion of the opening-related voxels on the imaginary section is excessively small, high precision is not achieved for the microstructure analysis. Therefore, the predetermined distance of the shift is preferably set so that the proportion is relatively large. The imaginary reference plane on the outflow plane 62 side is also defined in the same manner.

Subsequently, the CPU 22 derives various information concerning an opening of a pore-linear portion from the opening-related voxels that appear on the imaginary reference plane (Step S520). The pore-linear portion is a bundle of adjacent straight pores and corresponds to a portion of an actual pore that linearly extends from the opening. Examples of the information concerning the opening of the pore-linear portion include the numbers Ca and Cb (the subscript "a" indicates the inflow plane 61 side and the subscript "b" indicates the outflow plane 62 side, the same applies hereafter) of the openings of the pore-linear portions, the opening areas Sa and Sb, the opening diameters Da and Db, the opening ratios ARa and ARb, and information obtained by processing the foregoing. The numbers Ca and Cb of the pore-linear portions are obtained by assuming the opening-related voxels adjacent to each other on the imaginary reference plane to be an opening of a single pore and counting the number of the opening. The opening areas Sa and Sb are an area of each opening of the pore-linear portion on the imaginary reference plane, which is calculated by multiplying the number of opening-related voxels constituting the opening by an area (herein 1.44 μm$^2$) of one face of a voxel. The opening diameters Da and Db are mathematically determined from a circle area that is assumed to be equivalent to the opening area Sa for the sake of convenience. The opening ratio ARa is the ratio of the total area of the opening areas Sa to the area of the imaginary reference plane. The opening ratio ARb is the ratio of the total area of the opening areas Sb to the area of the imaginary reference plane.

Figure 14:
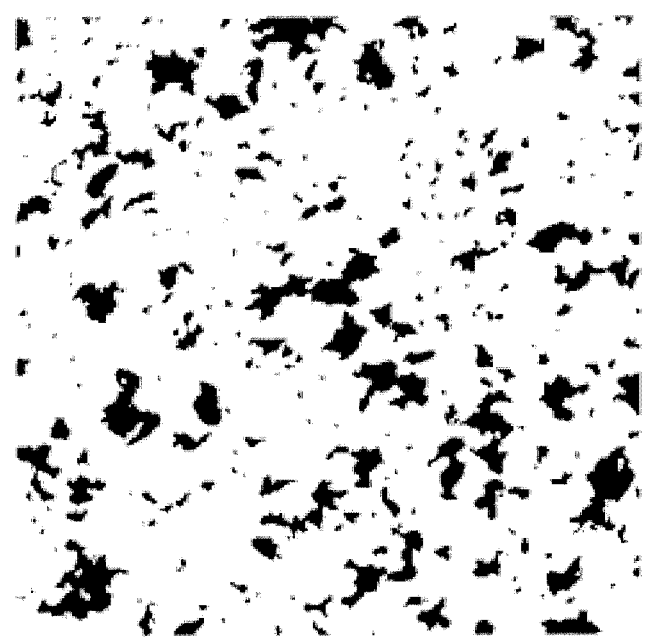
FIG. 14 is a distribution chart of an opening of a pore-linear portion.
Figure 15:
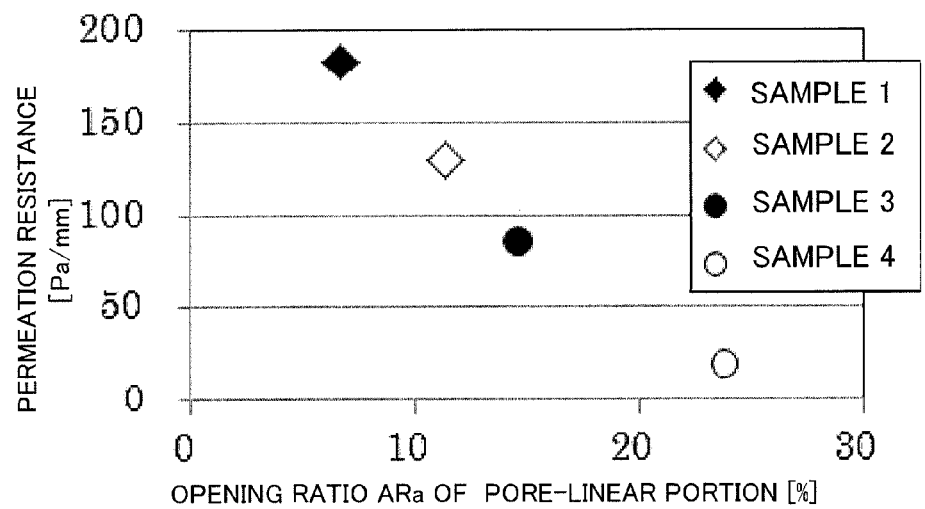
FIG. 15 is a graph showing, the relationship between an opening ratio of pore-linear portions and the permeation resistance.
Figure 16:
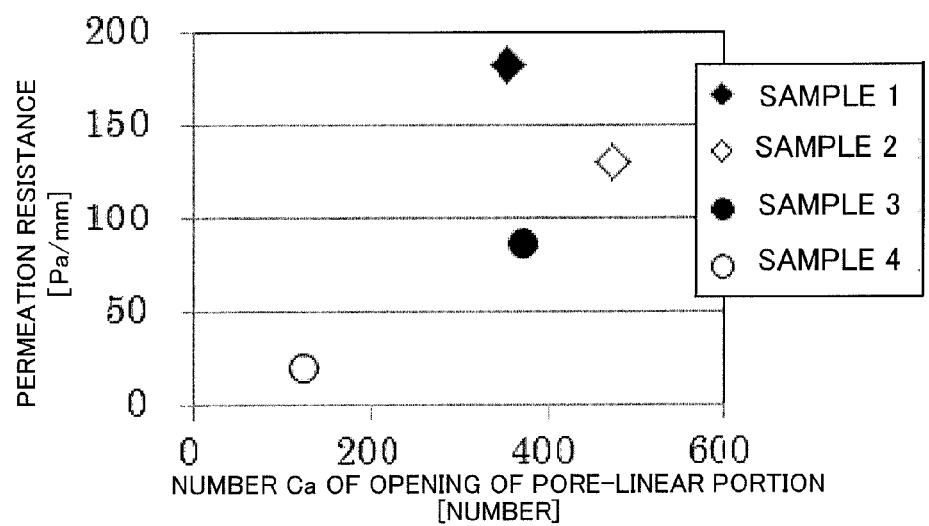
FIG. 16 is a graph showing the relationship between the number of openings of pore-linear portions and the permeation resistance.
Figure 17:
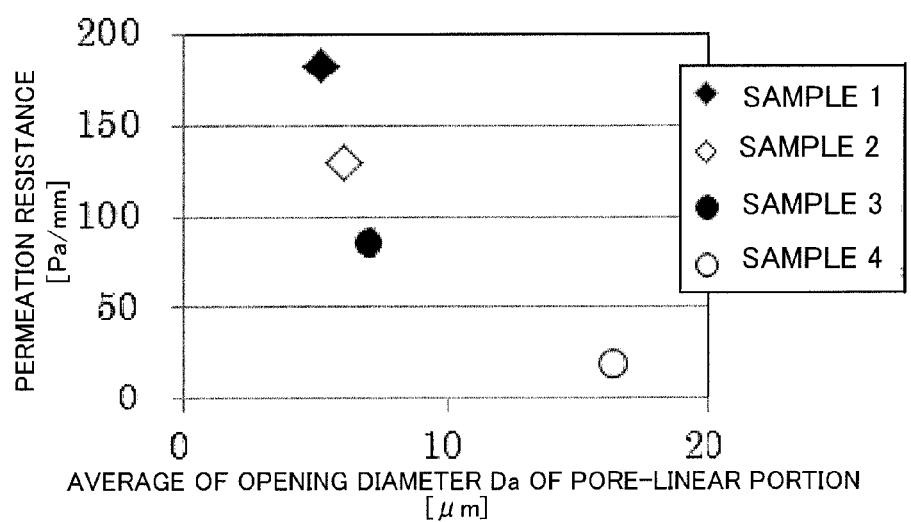
FIG. 17 is a graph showing the relationship between the average of opening diameters of pore-linear portions and the permeation resistance.
Figure 18:
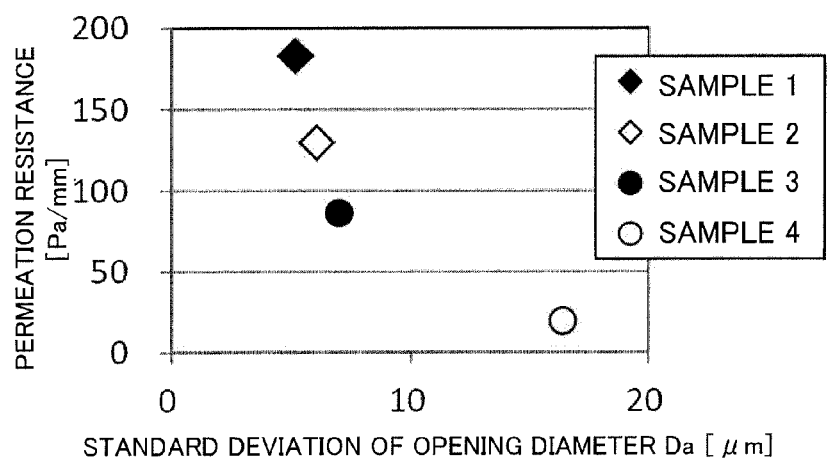
FIG. 18 is a graph showing the relationship between the standard deviation of opening diameters of pore-linear portions and the permeation resistance.

Subsequently, the CPU 22 visualizes the distribution of the openings of the pore-linear portions and displays the distribution on the display 26 (Step S530). Specifically, the opening-related voxels on the imaginary reference plane are expressed in black and other voxels are expressed in white. When the voxels appearing on the imaginary reference plane are assumed to be two-dimensional pixels, each pixel is displayed on the screen in black or white. FIG. 14 illustrates an example thereof. Thus, the operator can visually recognize the size of the openings of the pore-linear portions on the imaginary reference plane. Note that white and black are used herein, but any colors may be used.

Subsequently, the CPU 22 plots a graph of the relationship between various information concerning the openings of the pore-linear portions and the permeation resistance, displays the relationship on the display 26 (Step S540), ends this routine, returns to the main routine, and ends the main routine. In Step S540, for example, the relationship between the opening ratio ARa and the permeation resistance, the relationship between the number Ca of openings of pore-linear portions and the permeation resistance, the relationship between the average of the opening diameters Da of pore-linear portions and the permeation resistance, and the relationship between the standard deviation of the opening diameters Da of pore-linear portions and the permeation resistance are graphed and displayed on the display 26. FIG. 15 to FIG. 18 illustrate examples thereof. Also in these drawings, the parameters such as the opening ratio ARa are determined for the above-described samples 1 to 4 and plotted on a graph. Thus, the operator can understand whether there is a correlation between each parameter and the permeation resistance. If there is some correlation, the operator can understand what the correlation is.

The correspondence of the constituent elements in this embodiment and the microstructure analyzer according to the present invention will be described. The user PC 20 in this embodiment corresponds to a microstructure analyzer according to the present invention, the RAM 24 and the HDD 25 correspond to storage, and the CPU 22 corresponds to an identification device and an analyzer. In this embodiment, an example of the method for analyzing a microstructure according to the present invention has been also disclosed by describing the operation of the user PC 20.

In this embodiment described above in detail, the microstructure of the porous body is analyzed on the basis of the opening-related voxels (in particular, the opening-related voxels that appear on the imaginary surface or the imaginary reference plane). Although pores of the porous body often bend, it is believed that pore-linear portions, which are portions of pores that linearly extend from openings, have a relatively large influence on the characteristics of the porous body. Such pore-linear portions can be expressed using the opening-related voxels. Therefore, information concerning the pore-linear portions (e.g., information concerning straight pores and information concerning the openings of the pore-linear portions) can be obtained by analyzing the microstructure of the porous body on the basis of the opening-related voxels.

The plane obtained by shifting the imaginary surface in an inward direction of the porous body by the predetermined distance is defined as the imaginary reference plane. The predetermined distance is set to such a distance that the ascending order of the proportion of the opening-related voxels on the imaginary section matches the ascending order of the porosity. Therefore, there is a low possibility that the opening-related voxels appearing on the imaginary reference plane include simple irregularities (not pores) on the surface of the porous body. This increases the precision when the microstructure of the porous body is analyzed on the basis of the opening-related voxels.

It should be appreciated that the present invention is not limited to the above-described embodiment and can be implemented in numerous ways without departing from the technical scope of the present invention.

Figure 19:
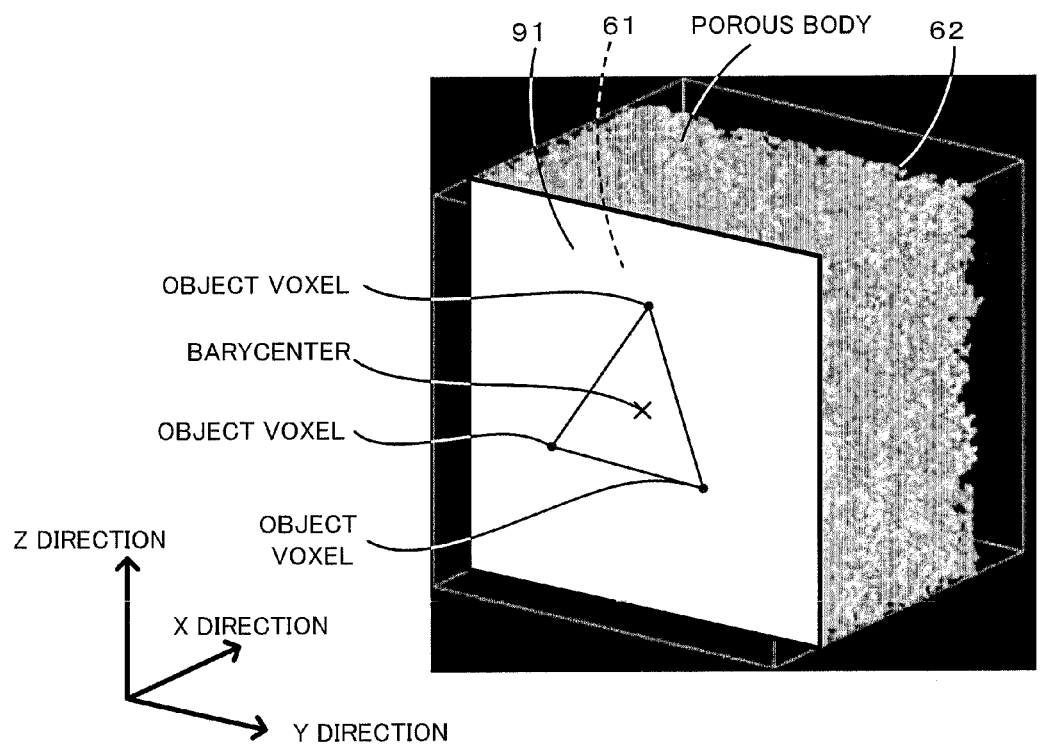
FIG. 19 is an explanatory view of another determination procedure of an imaginary surface 91.

For example, in the above-described embodiment, the imaginary surface 91 has been defined as a plane parallel to the YZ plane, but the definition is not limited thereto. For example, when the inflow plane 61 and the outflow plane 62 are not parallel to the YZ plane and have a certain angle (e.g., 1 to 5°) with the YZ plane, the imaginary surface 91 may be defined as follows. That is, as illustrated in FIG. 19, the imaginary surface may be defined as a plane which is in contact with three or more object voxels present on the surface of the porous body and in which a triangle formed by at least one set of three object voxels selected from the three or more object voxels involves a barycenter of the surface. Since the imaginary surface 91 is defined as a plane substantially parallel to the surface of the porous body, the information concerning the pore-linear portions can be obtained with high precision. In this case, the linear direction used when the opening-related voxels are identified may be an X-axis direction, but is preferably a direction perpendicular to the imaginary surface.

In the above-described embodiment, it has been described that the phrase "the imaginary surface 91 is in contact with the object voxels" means that voxels constituting the imaginary surface 91 are in surface contact with the object voxels (refer to FIG. 8), but the description is not limited thereto. For example, the phrase "the imaginary surface 91 is in contact with the object voxels" may mean that voxels constituting the imaginary surface 91 involve object voxels present on the surface of the porous body (refer to FIG. 20). In this case, when the opening-related voxels are identified, all spatial voxels (spatial voxels in contact with the imaginary surface 91) whose X coordinate value is the same as that of the imaginary surface 91 are identified as opening-related voxels, and two or more spatial voxels that continuously lie in a predetermined linear direction (X direction) from the thus-identified opening-related voxels toward the inside of the porous body are also identified as opening-related voxels. The same effects as those in the above-described embodiment are also achieved even in this case.

Figure 20:
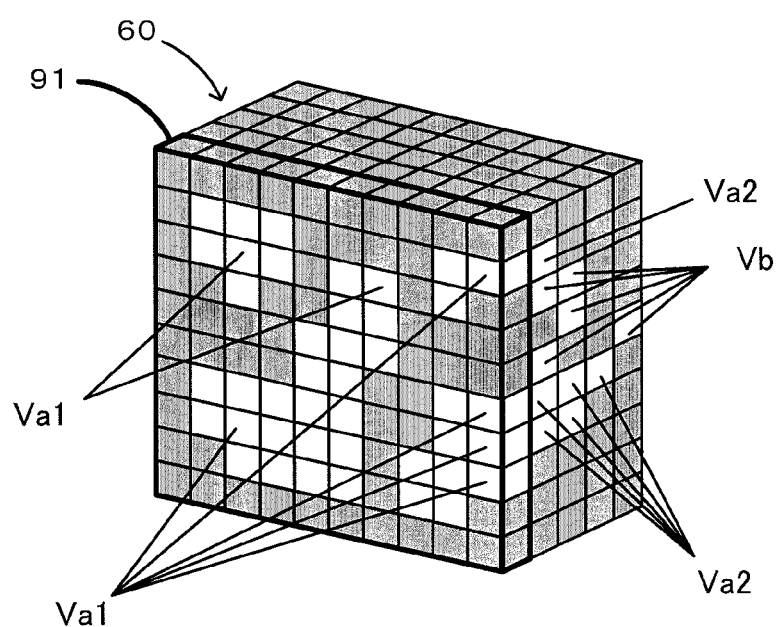
FIG. 20 is an explanatory view of another determination procedure of an imaginary surface 91.

In the above-described embodiment, as illustrated in FIG. 8, when the opening-related voxels are identified, all spatial voxels in contact with the imaginary surface 91 have been identified as the opening-related voxels. However, such spatial voxels in contact with the imaginary surface 91 may be identified as the opening-related voxels as long as the predetermined number or more of spatial voxels are continuously present in a predetermined linear direction (X direction) toward the inside of the porous body (the predetermined number is an integer of 2 or more). In this case, the straight pores are an aggregate of voxels in a row constituted by opening-related voxels that continuously lie in a predetermined linear direction (X direction) from the imaginary surface toward the inside of the porous body. The substantially same effects as those in the above-described embodiment are also produced even in this case. In FIG. 20, such identification may also be carried out.

In the above-described embodiment, graphs made on the basis of the information concerning the pore-linear portions on the inflow plane 61 side are illustrated in FIG. 15 to FIG. 18. The same graphs can also be obviously made on the basis of the information concerning the pore-linear portions on the outflow plane 62 side.

The present application claims priority from Japanese Patent Application No. JP 2015-082708, filed on Apr. 14, 2015, the entire contents of which are incorporated herein by reference.

What is claimed is:

1. A method for analyzing a microstructure of a porous body, comprising: using porous-body data in which positional information providing a position of a voxel of a porous body obtained by three-dimensional scanning is associated with voxel type information including information that allows determination as to whether the voxel is a spatial voxel representing a space or an object voxel representing an object, the method further comprising:
    (a) a step of defining an imaginary surface that is in contact with at least one object voxel present on a surface of the porous body, and identifying, as opening-related voxels, a spatial voxel that is in contact with the imaginary surface and a predetermined number or more of spatial voxels that continuously lie in a predetermined linear direction from the imaginary surface toward an inside of the porous body or identifying, as opening-related voxels, a predetermined number or more of spatial voxels that continuously lie in a predetermined linear direction from the imaginary surface toward an inside of the porous body; and
    (b) a step of analyzing a microstructure of the porous body on a basis of the opening-related voxels.

2. The method for analyzing a microstructure of a porous body according to claim 1,
    wherein in the step (a), the imaginary surface is defined as a plane parallel to any of an XY plane, an XZ plane, and a YZ plane in three-dimensional coordinates; or a plane which is in contact with three or more object voxels present on the surface of the porous body and in which a triangle formed by at least one set of three object voxels selected from the three or more object voxels includes a barycenter of the surface of the porous body.

3. The method for analyzing a microstructure of a porous body according to claim 1,
    wherein in the step (b), when the microstructure of the porous body is analyzed on a basis of the opening-related voxels, the microstructure of the porous body is analyzed on a basis of at least information obtained from the opening-related voxels that appear on the imaginary surface.

4. The method for analyzing a microstructure of a porous body according to claim 3,
    wherein in the step (b), the information is information concerning straight pores constituted by opening-related voxels that continuously lie in the linear direction from the imaginary surface.

5. The method for analyzing a microstructure of a porous body according to claim 1,
    wherein in the step (b), when the microstructure of the porous body is analyzed on a basis of the opening-related voxels, a plane obtained by shifting the imaginary surface in an inward direction of the porous body by a predetermined distance is defined as an imaginary reference plane, and the microstructure of the porous body is analyzed on a basis of at least information obtained from the opening-related voxels that appear on the imaginary reference plane.

6. The method for analyzing a microstructure of a porous body according to claim 5,
wherein in the step (b), the information is information concerning a pore-linear portion that is an aggregate of opening-related voxels adjacent to each other on the imaginary reference plane.

7. The method for analyzing a microstructure of a porous body according to claim 5,
wherein in the step (b), when the predetermined distance is set, multiple pieces of porous-body data having different porosities are prepared in advance, a relationship between a distance from the imaginary surface to an imaginary section and a proportion of the opening-related voxels on the imaginary section is determined for each of the porous-body data, a range of the distance in which an ascending order of the proportion matches an ascending order of the porosity is determined, and the predetermined distance is set within the range.

8. A non-transitory computer readable medium storing a program causing a computer to execute each step in the method for analyzing a microstructure of a porous body according to claim 1.

9. A microstructure analyzer comprising:
storage for storing porous-body data in which positional information providing a position of a voxel of a porous body obtained by three-dimensional scanning is associated with voxel type information including information that allows determination as to whether the voxel is a spatial voxel representing a space or an object voxel representing an object;
identification device for defining an imaginary surface that is in contact with at least one object voxel present on a surface of the porous body, and identifying, as opening-related voxels, spatial voxels that are in contact with the imaginary surface and a predetermined number or more of spatial voxels that continuously lie in a predetermined linear direction from the imaginary surface toward an inside of the porous body or identifying, as opening-related voxels, a predetermined number or more of spatial voxels that continuously lie in a predetermined linear direction from the imaginary surface toward an inside of the porous body; and
an analyzer for analyzing a microstructure of the porous body on a basis of the opening-related voxels.

\* \* \* \* \*

UNITED STATES PATENT AND TRADEMARK OFFICE
CERTIFICATE OF CORRECTION

PATENT NO. : 9,953,419 B2  
APPLICATION NO. : 15/086684  
DATED : April 24, 2018  
INVENTOR(S) : Ayaka Sakai, Satoshi Sakashita and Hiroyuki Nagaoka Page 1 of 1

It is certified that error appears in the above-identified patent and that said Letters Patent is hereby corrected as shown below:

On the Title Page

Foreign Application Priority Data, Item (30):
Please change: "April 14, 2016 (JP)...... 2015-082708" to -- April 14, 2015 (JP)...... 2015-082708 --

Signed and Sealed this
Twenty-ninth Day of May, 2018

Andrei Iancu
*Director of the United States Patent and Trademark Office*